United States Patent [19]
Harada

[11] Patent Number: 4,974,220
[45] Date of Patent: Nov. 27, 1990

[54] APPARATUS FOR POSITIONING AN OPTICAL HEAD ON A DESTINATION TRACK WHICH DISCRIMINATES TRACK LANDS AND GROOVES

[75] Inventor: Toshihisa Harada, Tokyo, Japan

[73] Assignee: NEC Corporation, Tokyo, Japan

[21] Appl. No.: 290,003

[22] Filed: Dec. 27, 1988

[30] Foreign Application Priority Data

Dec. 24, 1987 [JP] Japan ................. 62-329097

[51] Int. Cl.$^5$ .............................................. G11B 7/085
[52] U.S. Cl. ................................................ 369/44.26
[58] Field of Search .................. 369/32, 44.11, 44.26, 369/44.28, 44.29, 44.35, 44.41; 358/342; 250/201; 360/78.01, 78.04, 78.05, 78.06

[56] References Cited
U.S. PATENT DOCUMENTS 4,893,298  1/1990  Pasman et al. ............... 369/44.37 X Primary Examiner—Robert L. Richardson
Attorney, Agent, or Firm—Sughrue, Mion, Zinn, Macpeak & Seas

[57] ABSTRACT

An apparatus for positioning an optical head on an optical recording medium capable of accurately detecting the direction of the beam spot transverse movement for positioning the beam spot to a destination track. The apparatus accurately discriminates track lands and track grooves from each other during the scanning of the light beam spot across the tracks for positioning the beam spot to a destination track.

8 Claims, 3 Drawing Sheets

APPARATUS FOR POSITIONING AN OPTICAL HEAD ON A DESTINATION TRACK WHICH DISCRIMINATES TRACK LANDS AND GROOVES

BACKGROUND OF THE INVENTION

The present invention relates to an apparatus for optically recording and reproducing data to and from a recording medium and, more particularly, to an apparatus for positioning an optical head on a destination track of the recording medium.

A conventional apparatus for optically recording and reproducing data comprises an optical head for irradiating and receiving a light beam to and from a recording medium on which a plurality of tracks are formed. The position of the optical head is controlled by a head positioning control device which carries out coarse positioning servo control for moving the optical head across the tracks toward a destination track and then carries out fine positioning servo control for adjusting the position of a light beam spot on the destination track by means of an objective lens.

In order to improve the positioning accuracy of the coarse positioning servo control, a number of tracks traversed or crossed by the light beam spot is counted to determine the current position of the optical head so as to produce a track traversing signal. In such a case, the moving speed of the optical head relative to the recording medium is determined by frequency-voltage-converting of the track traversing signal so as to control the driving speed of the optical head.

In the system where the traversing speed is detected until the fine positioning operation of the beam spot to the destination track is carried out, the velocity of the optical head is determined by the frequency of the track traversing signal, and the polarity of the traversing speed signal, i.e., the moving direction of the optical head is determined by a direction command indicative of the traversing direction of the optical head in order to discriminate between alternate track lands and track grooves.

However, in the above described conventional apparatus, a drawback exists in that the accurate direction of the speed signal cannot be obtained while the optical head moves at low speed, i.e., immediately before the fine positioning servo control. In order to stably and promptly change from the coarse to fine servo control, highly accurate speed and accurate detection of the movement of the optical head are needed. However, since the direction of the movement of the optical head, i.e., the direction of the beam spot movement, cannot be correctly detected in the conventional apparatus, another drawback exists in that the optical head runs out of control when the polarity of the voltage speed signal is incorrectly recognized due to external disturbance or eccentricity of the destination track. Further, since discrimination between the track land and the track groove is difficult, a further drawback exists in that the positioning of the destination track may be carried out in a reverse direction, resulting in an unstable fine positioning servo control operation.

SUMMARY OF THE INVENTION

An object of the present invention is, therefore, to provide an apparatus for positioning an optical head capable of accurately detecting the direction of the beam spot transverse movement for positioning the beam spot to a destination track.

Another object of the invention is, therefore, to provide an apparatus for positioning an optical head capable of accurately discriminating track lands and track grooves from each other during the scanning of light beam spot across the tracks for positioning the beam spot to a destination track.

According to one aspect of the present invention, an apparatus is provided for positioning an optical head in which the direction of transverse movement of a light beam is detected during scanning thereof across a periodic track of alternate track lands and grooves formed on an optical recording medium. Namely, according to the invention, an apparatus for positioning an optical head on an optical recording medium to a destination track by scanning an optical recording medium across a periodic track arrangement of alternate track lands and grooves formed on the optical recording medium comprises photo detecting means for detecting a reflected light beam irradiated from the optical head and reflected from the optical recording medium. The photo detecting means includes a first pair of segments for producing a tracking error signal and a second pair of segments for producing a data reproducing signal. In addition, the apparatus includes means for producing a track polarity signal based on the sum of outputs of each of the first pair of segments, the track polarity signal representing discrimination between the track lands and grooves. Moreover, the apparatus comprises means for producing a track crossing signal based on the difference of the outputs of each of the first pair of segments as well as means for producing a track crossing pulse in response to the track polarity signal and the track crossing signal. The track crossing pulse is indicative of forward or backward direction of the scanning movement of the optical head. Finally, the apparatus comprises and means for producing a velocity signal in response to the track crossing pulse, the velocity signal being indicative of velocity and direction of the scanning movement of the optical head.

DESCRIPTION OF THE PREFERRED EMBODIMENT

An embodiment of the invention will be explained in conjunction with the drawings.

Figure 1:
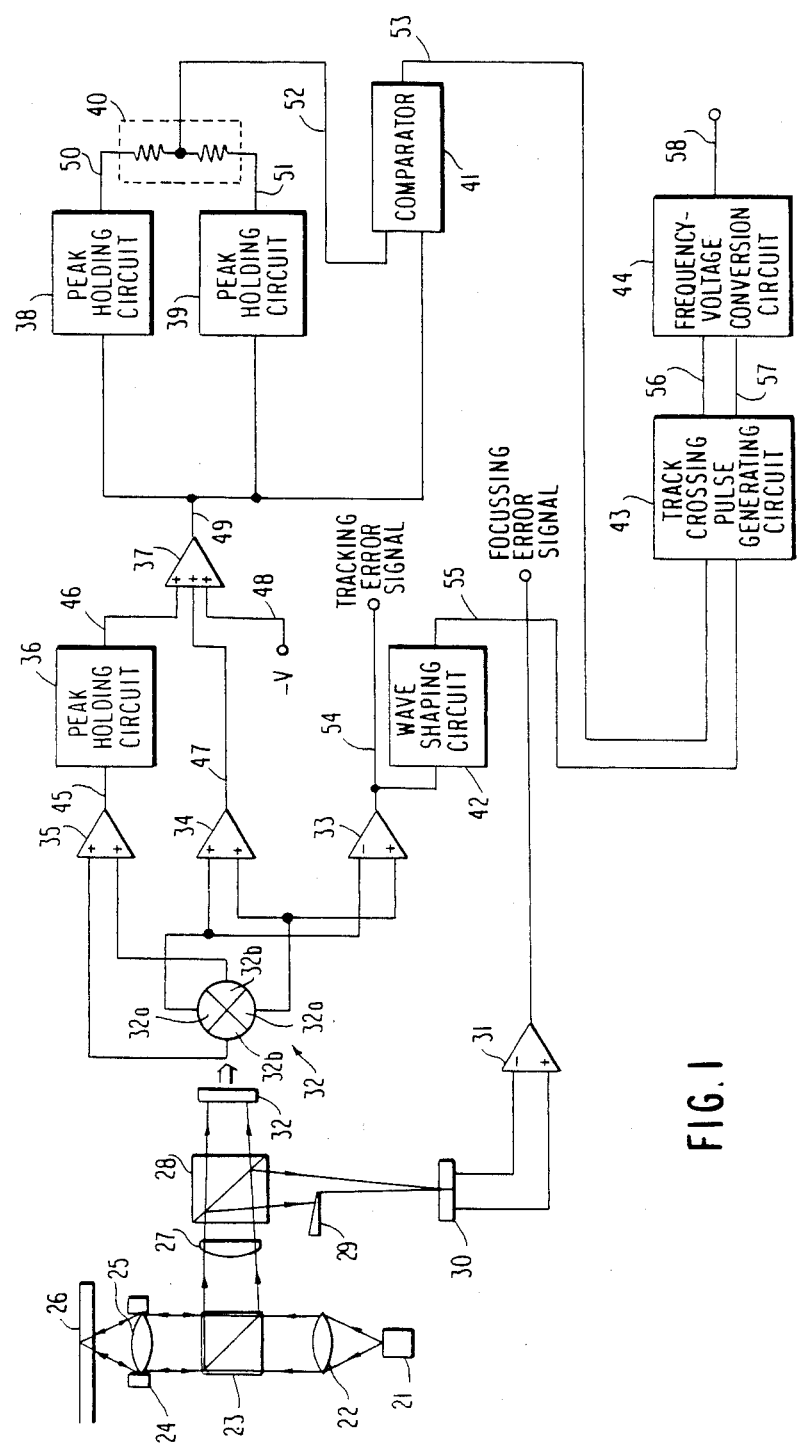
FIG. 1 is a block diagram showing an embodiment according to the invention.

Referring to FIG. 1, a semiconductor laser 21 emits a laser beam which is converted into a parallel beam by a collimating lens 22 and then irradiated onto a recording medium, i.e., an optical disk 26 through a beam splitter 23 and an objective lens 25. The reflected beam from the optical disk 26 is reversely transmitted through the objective lens 25, then reflected by the beam splitter 23, converged by a converging lens 27, and thereafter directed to a half-mirror 28. The half-mirror 28 divides the reflected beam into two parts. One part reflected by the half-mirror 28 is partially blocked by a knife edge 29 and then irradiated onto a photo detector 30 which is divided in two parts. The outputs from the two-part photo detector 30 are subtracted from one another by a differential amplifier 31 to produce a focussing error signal indicative of the focussing error of the laser beam spot on the optical disk 26.

The other part of the reflected beam transmitted through the half-mirror 28 is irradiated onto a photo detector 32 divided into four parts. The four-part photo detector 32 includes a first pair of segments 32a divided from each other in the radial direction of the optical disk 26, i.e., the direction transversing the tracks of the disk 26 so as to detect the tracking error of the laser beam spot relative to the optical disk 26 . A second pair of segments 32b of the detector 32 are divided from each other in the circumferential direction of the optical disk 26 so as to reproduce data stored in the optical disk 26. The outputs from the second pair segments 32b are added to each other by an adding amplifier 35 to produce a data reproducing signal 45 indicative of the recorded data. The outputs from the first pair segments 32a are added to each other by an adding amplifier 34 to produce a track detecting signal 47 effective to control the tracking of the beam spot. The outputs from the first pair segments 32a are also subtracted from each other by a differential amplifier 33 to produce a tracking error signal 54 indicative of the deviation of the beam spot from respective track lands.

A peak holding circuit 36 sequentially detects and holds positive peak levels of the data reproducing signal 45 to produce a peak-hold signal 46. During the scanning of the beam spot transversely to the tracks, that is, the radial direction of the optical disk 26, the peak-hold signal 46 is added to the track detecting signal 47 by an adding amplifier 37 to produce a compensated track detecting signal 49. During the addition, an offset compensating voltage 48 is concurrently added to remove a direct current component from the compensated track detecting signal 49.

The compensated signal 49 is input into first and second peak holding circuits 38 and 39. The first peak holding circuit 38 holds a positive peak of the compensated signal 49 while the second peak holding circuit 39 holds a negative peak of the same signal 49. The peak-hold signals 50 and 51 are inputted into a resistive-dividing circuit 40. The resistive-dividing circuit 40 produces a reference signal 52 which has a mean voltage level between the peak-hold signals 50 and 51 and is fed to a comparator 41. Further, the compensated signal 49 is inputted into the comparator 41 and compared to the reference signal 52 to produce a track polarity signal 53 having two voltage levels corresponding to the intensity of the reflected beam from the track lands and the track grooves.

At the same time, during the scanning of the beam spot transversely to the track, the analog tracking error signal 54 is zero-cross-detected and digitized by a wave shaping circuit 42 to produce a track crossing signal 55 indicative of the transverse moving direction of the beam spot across the tracks. The track polarity signal 53 and track crossing signal 55 are inputted into a track crossing pulse generating circuit 43 to generate a forward track crossing pulse 56 or a backward track crossing pulse 57 according to the traversing direction of the beam spot.

Namely, the phase of the track polarity signal 53 advances 90° or delays 90° relative to the track crossing signal 55 in accordance with the traversing direction of the spot relative to the tracks. Therefore, by detecting this phase difference, the traversing direction can be determined. Each time the laser beam spot traverses or crosses one track, the forward track crossing pulse 56 or backward track crossing pulse 57 is selectively produced according to the traverse direction and fed to a frequency-voltage conversion circuit 44. The conversion circuit 44 carries out the frequency-voltage conversion of a train of the forward or backward pulses 56 or 57 to produce a velocity signal 58 indicative of the transversely moving speed of the beam spot. The velocity signal 58 has a positive voltage when the forward track crossing pulse 56 is generated and a negative voltage when the backward track crossing pulse 57 is generated.

Next, the circuit operation will be described in conjunction with FIGS. 2 and 3.

Figure 2:
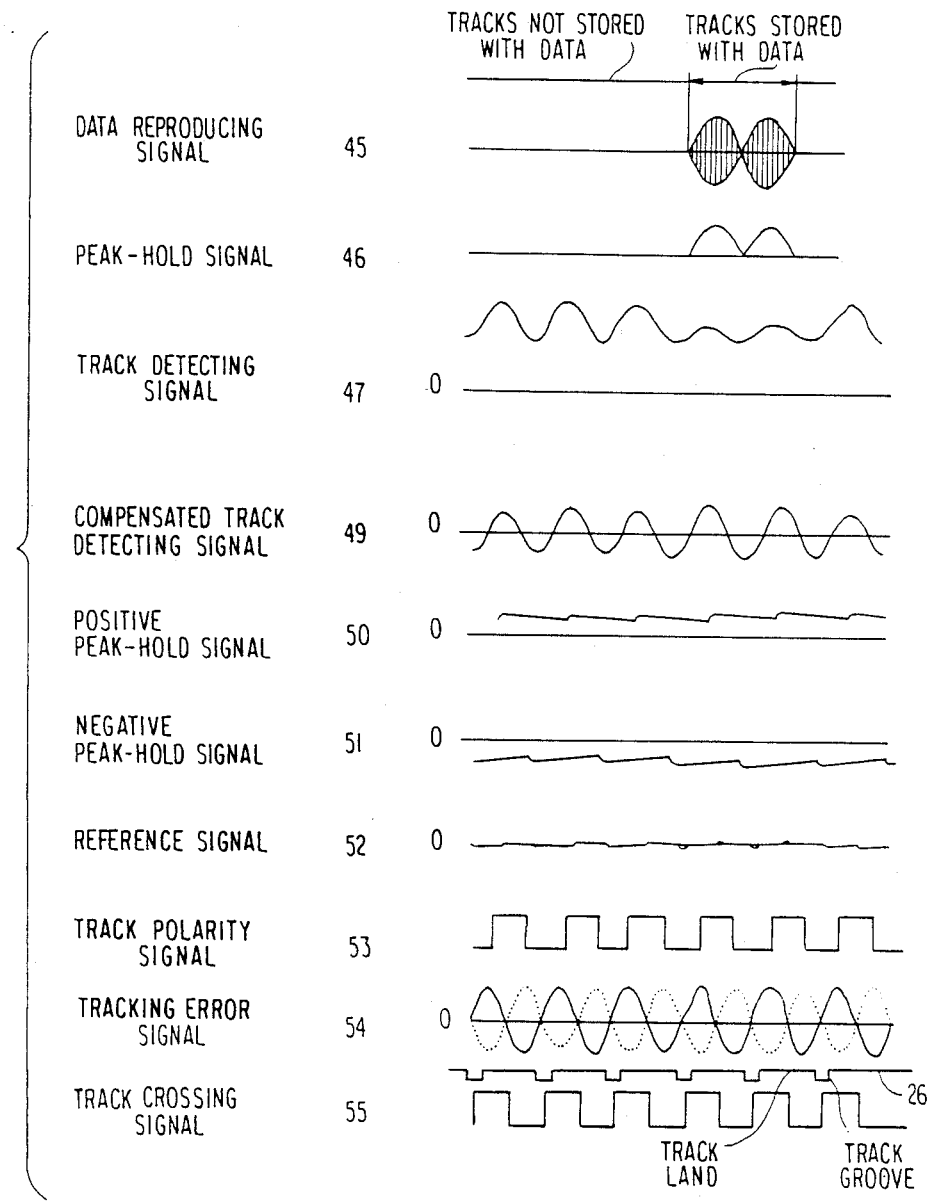
FIGS. 2 and 3A and B show waveforms of signals for describing the operation of block diagram shown in FIG. 1.

As shown in FIG. 2, during the scanning of the beam spot across the tracks, the track detecting signal 47 has maximum peaks corresponding to respective track lands which reflect a greater intensity of the laser beam, and has minimum peaks corresponding to respective track grooves which reflect a smaller intensity of the laser beam. Therefore, the track detecting signal 47 can indicate whether the beam spot is positioned on the track land or track groove during transverse beam spot scanning. However, the track detecting signal 47 has an irregularly smaller amplitude when the beam spot is moving across the track lands which contain bit data in the form of pits. Namely, the pits reduce the reflection intensity of the beam reflected from the respective track land, thus causing the irregular amplitude reduction of the track detecting signal 47. The closer the interval between adjacent pits along the track land, the smaller the light intensity reflected from the track land, and therefore smaller the amplitude of track detecting signal 47.

In order to compensate for the reduction of the amplitude of the track detecting signal 47 due to the pits on the track land, the peak of the data reproduction signal 45 is held by the peak holding circuit 36 to produce the peak-hold signal 46. Then, the peak-hold signal 46 is added to the track detecting signal 47 and the offset compensating voltage 48 to thereby produce the compensated track detecting signal 49. The compensated signal 49 has a sufficient amplitude even when the beam spot is crossing the pit-formed track lands The holding-time constant of the peak holding circuit 36 is several $\mu s$ so as to sufficiently respond to the amplitude change of the data reproducing signal 45.

In this embodiment, the data reproducing signal 45 is input directly into the peak holding circuit 36. However, since the smaller the pit interval, the smaller the amplitude of the data reproducing signal 45, the data reproducing signal 45 may be input into the peak holding circuit 36 through a high frequency amplifying circuit such as a differentiation circuit in order to amplify the high frequency component. In this case, the fluctuation of the peak-hold signal 46 caused by the change of recording frequency can be suppressed. The peak-hold signal 46 is output only when the beam spot moves across the pit-formed track lands and therefore, is suitable for compensation of the track detecting signal 47.

The compensated track detecting signal 49 has an alternate positive portion corresponding to each of the track lands and a negative portion corresponding to each of the track grooves. Accordingly, the compensated signal 49 is digitized or sliced with reference to the mean voltage level of amplitude thereof by the comparator 53. The comparator 53 produces the digital track polarity signal 53 having a high level indicating that the beam spot is currently positioned on the track land, and a low level indicating that the beam spot is currently positioned on a track groove.

More specifically, the reference signal 52 for use in the comparator 53 is produced by the first and second peak holding circuits 38 and 39 and the resistive-dividing circuit 40. Namely, the positive peak of signal 49 is held by the first peak holding circuit 38 to produce the positive peak-hold signal 50 and the negative peak of the same signal 49 is held by the second peak holding circuit 39 to produce the negative peak-hold signal 51. The positive and negative peak-hold signals 50 and 51 are input into the resistive-dividing circuit 40 to produce the reference signal 52 having the mean voltage output level between the positive and negative peaks. By such structure, the reference or slicing level can be stabilized stably against the amplitude fluctuation and the offset level fluctuation of the compensated signal 49.

In this embodiment, the reference signal 52 is determined by detecting the positive and negative peaks of the compensated signal 49. In the alternative, the compensated signal 49 can be transmitted through a low-pass filter of about 100 Hz to produce a similar reference signal.

During the transverse movement of the beam spot across the track lands and grooves in the radial direction of the optical disk 26, the first pair of the segments 32a of the photo detector 32 produces the respective detection outputs which are fed to the differential amplifier 33 to produce the tracking error signal 54. As shown in FIG. 2, when the beam spot is scanned forwardly (i.e., outwardly to the optical disk 26) relative to the periodical arrangement of track lands and grooves, the tracking error signal 54 has a waveform indicated by the solid line. When the beam spot is scanned backwardly (i.e., inwardly to the optical disk 26) in the reverse direction, the tracking error signal 54 has another waveform indicated by the dotted line which has the phase difference of 180° with respect to the waveform indicated by the solid line. This phase difference is due to the arrangement of the first segment pair 32a in the four-part photo detector 32.

The tracking error signal 54 is digitized or zero-cross-detected by the wave shaping circuit 42 to produce the corresponding digital track crossing signal 55. The track crossing signal 55 produced when the beam spot is scanned forwardly (hereinafter, referred to as "forward track crossing signal") has a phase difference of 180° relative to that produced when the beam spot is scanned backwardly (hereinafter, referred to as "backward track crossing signal"). Moreover, the forward and backward track crossing signals have a phase difference of ±90° relative to the track polarity signal 53 in the opposite directions, respectively.

Figure 3A:
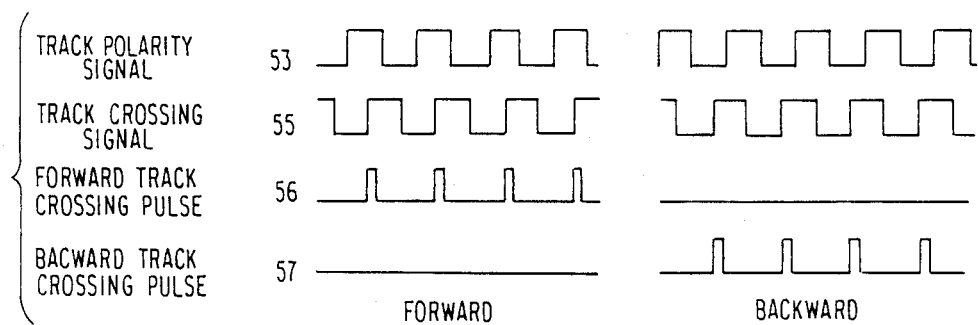

The production of the track crossing pulses will be explained with reference to FIG. 3A. As mentioned above, the track polarity signal 53 has the phase difference of ±90° relative to the track crossing signal 55 according to the moving direction of the beam spot. The track polarity and track crossing signals 53 and 55 are concurrently fed to the track crossing pulse generating circuit 43 to compare the phases thereof to each other.

More specifically, during the forward movement of the beam spot, the track polarity signal 53 is held at the high level at the leading edge of the track crossing signal 55 so that the forward track crossing pulse 56 is produced at each of the leading edges of the track crossing signal 55. During the backward movement of the beam spot, on the other hand, the track polarity signal 53 is held at the low level at the leading edge of the track crossing signal 55 so that the backward track crossing pulse 57 is produced at each of the leading edges of the track crossing signal 55. Consequently, the forward and backward track crossing pulses 56 and 57 are successively produced every time the beam spot crosses one track according to the moving direction of beam spot.

Figure 3B:
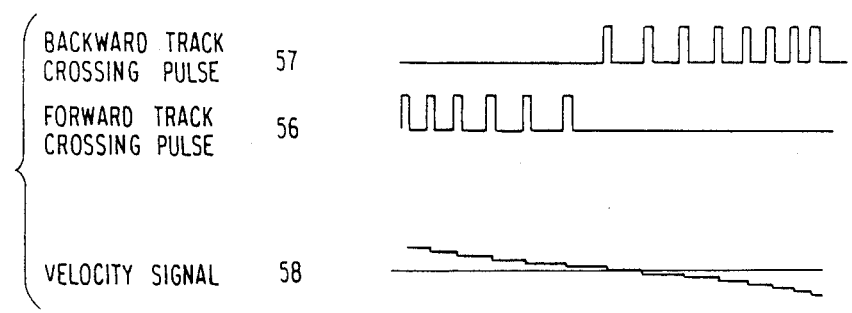

Referring to FIG. 3B, the train of the forward and backward track crossing pulses 56 and 57 are frequency-voltage-converted into the velocity signal 58 by the frequency-voltage conversion circuit 44. The velocity signal 58 has the voltage which indicates the speed of the beam spot scanning across the tracks, and the voltage polarity which indicates the moving direction of beam spot. Namely, the train of the forward and backward track crossing pulses 56 and 57 are frequency-voltage-converted into the positive and negative velocity signal 58, respectively, by the conversion circuit 44.

In this embodiment, a recording medium of the type in which the reflection intensity of the beam spot is reduced at the portions of the pits is utilized. However, when utilizing another recording medium of the type in which the reflection intensity of the beam spot is increased at the portions of the pits, the peak-hold signal 46 may be subtracted from the track detecting signal 47 to compensate the same.

As described above, according to the invention, the moving direction of the optical head is detected according to the track crossing signal 55 by utilizing the track polarity signal 53 so as to produce the accurate velocity signal 58. Further, the reduction of amplitude of the track detecting signal due to the pit-formed lands is compensated by adding the peak-hold signal 46 obtained from the data reproducing signal 45 so as to produce the track polarity signal 53 effective to accurately discriminate the lands and the grooves of the track. Therefore, the positioning operation to the destination track can be effected with high speed and the track following operation to the destination track based on the fine positioning servo can be stably carried out with high speed and high accuracy.

What is claimed is:

1. An apparatus for positioning an optical head on an optical recording medium to a destination track by scanning said optical recording medium across a periodic track arrangement of alternate track lands and grooves formed on said optical recording medium, comprising:

photo detecting means for detecting a reflected light beam irradiated from said optical head and reflected from said optical recording medium, said photo detecting means including a first pair of segments for producing a tracking error signal and a second pair of segment for producing a data reproducing signal;

means for producing a track polarity signal based on sum of outputs of each of said first pair of segments, said track polarity signal representing discrimination between said track lands and grooves;

means for producing a track crossing signal based on the difference of said outputs of each of said first pair of segments;

means for producing a track crossing pulse in response to said track polarity signal and said track crossing signal, said track crossing pulse being indicative of forward or backward direction of the scanning movement of said optical head; and means for producing a velocity signal in response to said track crossing pulse, said velocity signal being indicative of velocity and direction of said scanning movement of said optical head.

2. An apparatus as claimed in claim 1, wherein said means for producing a track polarity signal includes adding means for adding said data reproducing signal to said outputs of each of said first pair of segments so as to produce a compensated track detecting signal.

3. An apparatus as claimed in claim 2, wherein said means for producing a track polarity signal further includes reference signal producing means for producing a reference signal in response to said compensated track detecting signal and comparing means for comparing said reference signal and said compensated track detecting signal so as to produce said track polarity signal.

4. An apparatus as claimed in claim 3, wherein said reference signal producing means includes peak holding means for holding positive and negative peak values of said compensated track detecting signal and means for producing said reference signal by averaging said positive and negative peak values.

5. An apparatus as claimed in claim 1, wherein said first pair of segments is disposed transversely to the track arrangement of said optical disk and said second pair of segements is disposed along the track arrangement.

6. An apparatus as claimed in claim 1, wherein said means for producing a track crossing signal includes a wave shaping circuit for producing a recutangular wave signal from said difference of said output of said first pair of segments.

7. An apparatus as claimed in claim 1, wherein said means for producing a track crossing pulse detects the polarity of said track polarity signal at leading edges of said track crossing signal to determine said forward or backward direction.

8. An apparatus as claimed in claim 1, wherein said means for produces a velocity signal producing said velocity signal by frequency-voltage converting said track crossing pulse.

* * * * *